(12) United States Patent
Jung et al.

(10) Patent No.: US 10,501,881 B2
(45) Date of Patent: Dec. 10, 2019

(54) DAMPING DEVICE AND WASHING MACHINE INCLUDING THE SAME

(71) Applicant: Samsung Electronics Co., Ltd, Gyeonggi-do (KR)

(72) Inventors: Dong Ha Jung, Gyeonggi-do (KR); Kab Jin Jun, Gyeonggi-do (KR); Jeong Hoon Kang, Seoul (KR); Ji Hoon Choi, Gyeonggi-do (KR); Sang Young Kweon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 15/146,830

(22) Filed: May 4, 2016

(65) Prior Publication Data

US 2016/0326679 A1 Nov. 10, 2016

(30) Foreign Application Priority Data

May 4, 2015 (KR) .......................... 10-2015-0062481
Nov. 11, 2015 (KR) .......................... 10-2015-0158086

(51) Int. Cl.
*D06F 37/20* (2006.01)
*F16F 7/09* (2006.01)
*D06F 37/24* (2006.01)
*F16F 7/08* (2006.01)

(52) U.S. Cl.
CPC ............ *D06F 37/203* (2013.01); *D06F 37/24* (2013.01); *F16F 7/082* (2013.01); *F16F 7/09* (2013.01); *D06F 37/20* (2013.01)

(58) Field of Classification Search
CPC ............ D06F 37/20; D06F 37/24; F16F 7/09
See application file for complete search history.

(56) References Cited

U.S. PATENT DOCUMENTS

| 6,264,014 | B1* | 7/2001 | Ferlicca | D06F 37/20 188/129 |
| 6,397,643 | B1* | 6/2002 | Chang | D06F 37/24 68/23.1 |
| 2011/0308281 | A1* | 12/2011 | Yu | D06F 37/22 68/212 |
| 2013/0247622 | A1* | 9/2013 | Yu | D06F 37/24 68/13 R |
| 2015/0191860 | A1* | 7/2015 | Sim | D06F 37/265 68/23.3 |

(Continued)

FOREIGN PATENT DOCUMENTS

| KR | 10-2006-0023015 | 3/2006 |
| KR | 10-2012-0029853 | 3/2012 |
| KR | 10-1416184 | 2/2013 |

*Primary Examiner* — Joseph L. Perrin

(57) ABSTRACT

Disclosed herein is a washing machine including a damping device to be operable according to vibration displacement. In a washing machine including a damping device provided to damp a vibration transferred from a washing tub, the damping device includes a suspension member, a damping unit provided to move along the suspension member, and a friction unit provided in the damping unit to form a frictional force with the suspension member, and the friction unit is disposed while being spaced apart from an inner surface of the damping unit to be selectively movable depending on a level of the vibration of the washing tub.

20 Claims, 17 Drawing Sheets

(56) References Cited

U.S. PATENT DOCUMENTS

| | | | |
|---|---|---|---|
| 2016/0010260 A1* | 1/2016 | Kim | D06F 37/264 |
| | | | 68/131 |
| 2016/0010261 A1* | 1/2016 | Kim | D06F 37/24 |
| | | | 68/23.2 |
| 2016/0024705 A1* | 1/2016 | Hernden | D06F 37/24 |
| | | | 267/140.13 |
| 2017/0016164 A1* | 1/2017 | Kim | D06F 37/20 |

* cited by examiner

DAMPING DEVICE AND WASHING MACHINE INCLUDING THE SAME

CROSS-REFERENCE TO RELATED APPLICATION(S) AND CLAIM OF PRIORITY

This application claims the benefit of Korean Patent Application Nos. 10-2015-0062481 and 10-2015-0158086, filed on May 4, 2015 and Nov. 11, 2015, respectively in the Korean Intellectual Property Office, the disclosures of which are incorporated herein by reference.

FIELD

Embodiments of the present disclosure relate to a washing machine, and more particularly, to a damping device which operates according to vibration displacement and a washing machine including the same.

BACKGROUND

Generally, washing machines are apparatuses which perform washing, rinsing, and spin-drying operations to do the laundry.

Washing machines, depending on types, are classified into pulsator type washing machines in which water currents generated when small blades at a bottom of a washing tub rotate give the laundry a shock to wash, agitator type washing machines in which a large impeller with vanes attached to a center of a washing tub regularly turns around while reversed in direction and forms water currents to wash, and drum type washing machines in which the laundry is inserted into a drum and the drum rotates, thereby doing the laundry using a shock caused by a head and detergency of a detergent.

Washing machines each include a cabinet, a tub installed inside the cabinet to store washing water, a washing tub rotatably installed in the tub to accommodate the laundry, a driving device which rotates the washing tub, a water supply device which supplies the washing water to the tub, and a drainage device which discharges the washing water from the washing tub to the outside of the cabinet when washing is completed.

Meanwhile, while washing is performed, a vibration and noise occur due to the washing tub rotated by the driving device. To reduce such a vibration and noise, a damper is installed.

Generally, in the case of dampers, a frictional member is fixed to a bar so that only one damping force may act. Accordingly, during a spin-drying operation, vibration transfer to the outside increases in a transient vibration section of a low speed spin zone in which vibration displacement is great and driving is performed for a short time and a normal vibration section of a high speed spin zone in which vibration displacement is small and driving is performed for a long time, thereby generating a vibration and noise of an exterior of a washing machine.

SUMMARY

Therefore, it is an aspect of the present disclosure to provide a washing machine including a damping device capable of operating according to vibration displacement of the washing machine.

It is another aspect of the present disclosure to provide a damping device capable of reducing a vibration and noise of an exterior by minimizing vibration transfer to the outside by stopping movement of a friction portion at a high speed spin zone in which vibration displacement of a washing tub is small during a spin-drying operation and a washing machine including the damping device.

It is still another aspect of the present disclosure to provide a washing machine including a damping device with an improved structure capable of reducing a vibration and noise by changing a damping force of damper depending on vibration displacement of the washing machine.

It is yet another aspect of the present disclosure to provide a washing machine including a damping device which allows a friction unit to vertically move or rotate depending on a level of vibration of the washing machine to perform selective frictional movement to reduce vibration transfer to the outside, thereby reducing a vibration and noise.

Additional aspects of the present disclosure will be set forth in part in the description which follows and, in part, will be obvious from the description, or may be learned by practice of the present disclosure.

In accordance with one aspect of the present disclosure, a washing machine includes a damping device provided to damp a vibration transferred from a washing tub. Here, the damping device includes a suspension member, a damping unit provided to move along the suspension member, and a friction unit provided in the damping unit to form a frictional force with the suspension member. Also, the friction unit is disposed while being spaced apart from an inner surface of the damping unit to be selectively movable depending on a level of the vibration of the washing tub.

The friction unit may include a first friction member in contact with the suspension member and a second friction member provided to support the first friction member at an outside of the first friction member.

The damping unit may include a first damping portion installed at the suspension member and having a first accommodating portion which accommodates at least one part of the friction unit and a second damping portion which is provided below the first damping portion to be coupled with the first damping portion and has a second accommodating portion which accommodates another part of the friction unit.

The friction unit may be installed while being spaced apart from a top end of the first accommodating portion.

The friction unit may be installed while being spaced apart from a bottom end of the second accommodating portion.

The friction unit may include at least one of felt and rubber.

The first friction member may include a felt material.

The second friction member may include a cylindrical shape.

The damping unit may include a guide portion provided to be selectively rotatable and movable depending on the level of the vibration of the washing tub.

The guide portion may include a first guide portion provided at the friction unit and a second guide portion provided at at least one of the first damping portion and the second damping portion.

The first guide portion may include at least one guide protrusion which protrudes from an outside of the second friction member.

The second guide portion may include at least one guide groove slantingly formed at at least one of the first damping portion and the second damping portion.

The guide groove may include a spiral shape.

A bottom end of the first damping portion and a top end of the second damping portion may be formed corresponding to each other. Also, the damping unit may further include a connection portion provided to connect the first damping portion with the second damping portion.

In accordance with another aspect of the present disclosure, a washing machine includes a cabinet, a washing tub provided in the cabinet, and a damping device provided to damp a vibration of the washing tub. Here, the damping device may include a suspension member with one end coupled with the cabinet, a damping unit which is provided to be movable along the suspension member and forms an accommodating portion therein, and a friction unit disposed in the accommodating portion and provided to be movable from the damping unit.

The friction unit may be disposed while being spaced apart from an inner surface of the accommodating portion.

The friction unit may include a first friction member formed of a felt material and in contact with the suspension member and a second friction member provided to support the first friction member at an outside of the first friction member.

The friction unit may include at least one of felt and rubber.

The damping unit may include a first damping portion having a first accommodating portion which accommodates at least one part of the friction unit and a second damping portion which is provided below the first damping portion to be coupled with the first damping portion and has a second accommodating portion which accommodates another part of the friction unit.

The friction unit may be installed while being spaced apart from the first accommodating portion.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
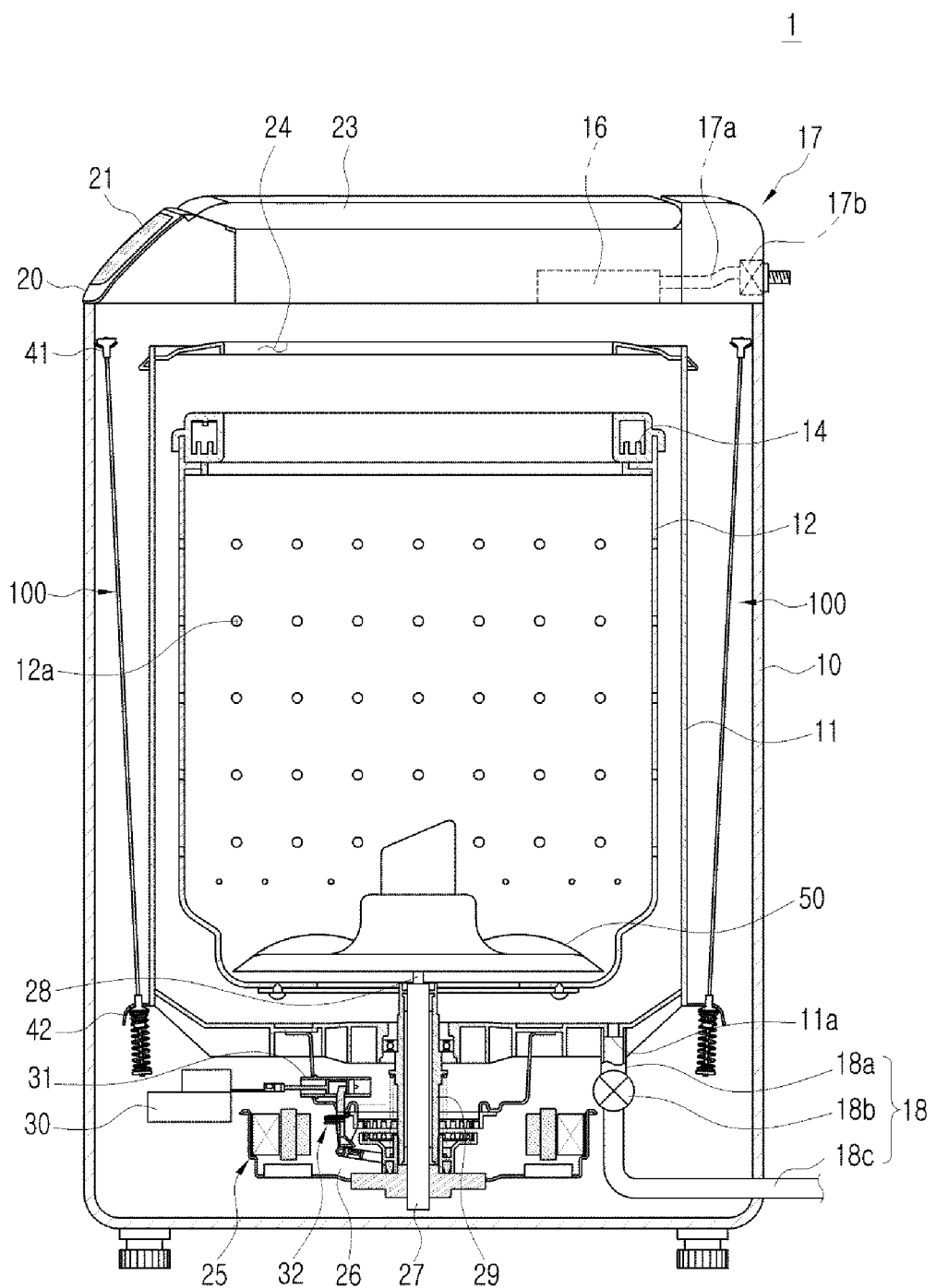
FIG. 1 is a cross-sectional view of a washing machine in accordance with one embodiment of the present disclosure.

Embodiments described herein and components shown in the drawings are merely exemplary examples. Also, various modified examples with which these embodiments and the drawings could be replaced may be present at the point in time of the filing of the present application.

Also, throughout the drawings, like reference numerals designate like elements.

Also, the terms herein are used to explain the embodiments but do not intend to restrict and/or limit the present disclosure. Singular expressions, unless defined otherwise in contexts, include plural expressions. Throughout the specification, the terms "comprise" or "have", etc. are used herein to specify the presence of stated features, numbers, steps, operations, elements, components or combinations thereof but do not preclude the presence or addition of one or more other features, numbers, steps, operations, elements, components, or combinations thereof.

Also, it will be understood that although the terms "first", "second", etc. may be used herein to describe various components, these components should not be limited by these terms. These terms are only used to distinguish one component from another. For example, without departing from the scope of the present disclosure, a first component may be designated as a second component, and similarly, the second component may be designated as the first component. The term "and/or" includes any and all combinations or one of a plurality of associated listed items.

Hereinafter, embodiments of the present disclosure will be described in detail with reference to the attached drawings.

Meanwhile, the terms used in the following description "a front end", "a rear end", "a top", "a bottom", "a top end", and "a bottom end" are defined based on the drawings. However, shapes and positions of respective components will not be limited thereto.

Figure 2:
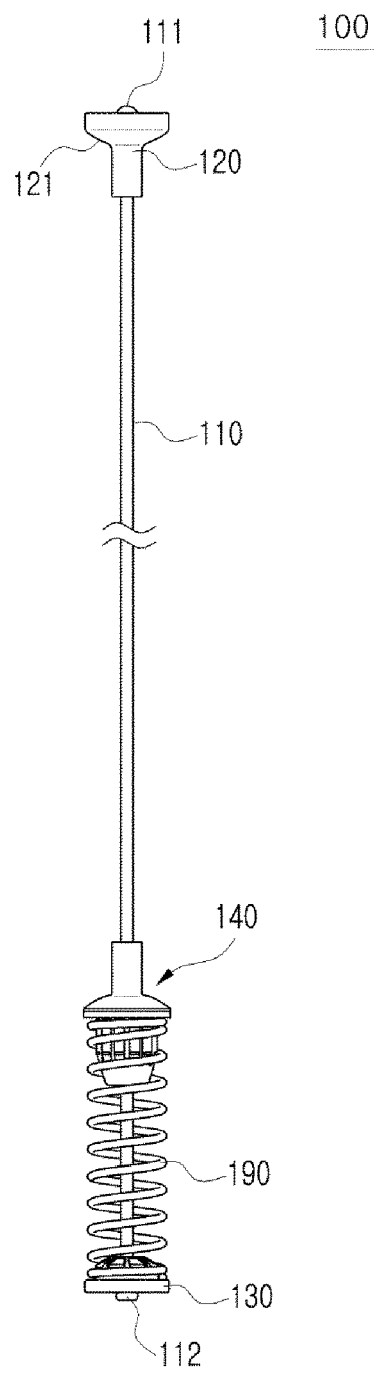
FIG. 2 is a front view of a damping device of the washing machine in accordance with one embodiment of the present disclosure.
Figure 3:
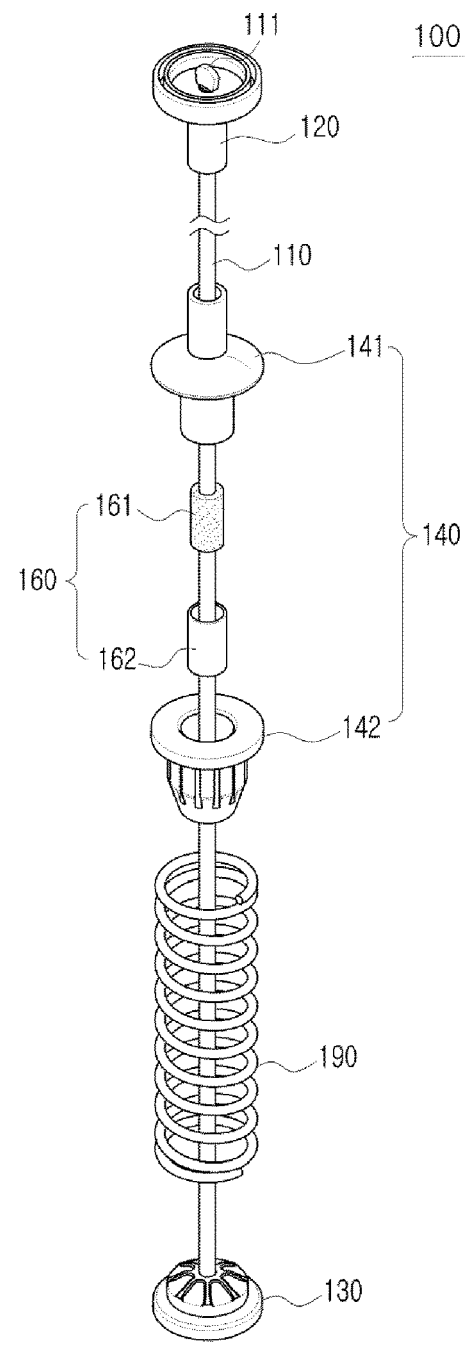
FIG. 3 is an exploded perspective view of the damping device of the washing machine in accordance with one embodiment of the present disclosure.
Figure 4:
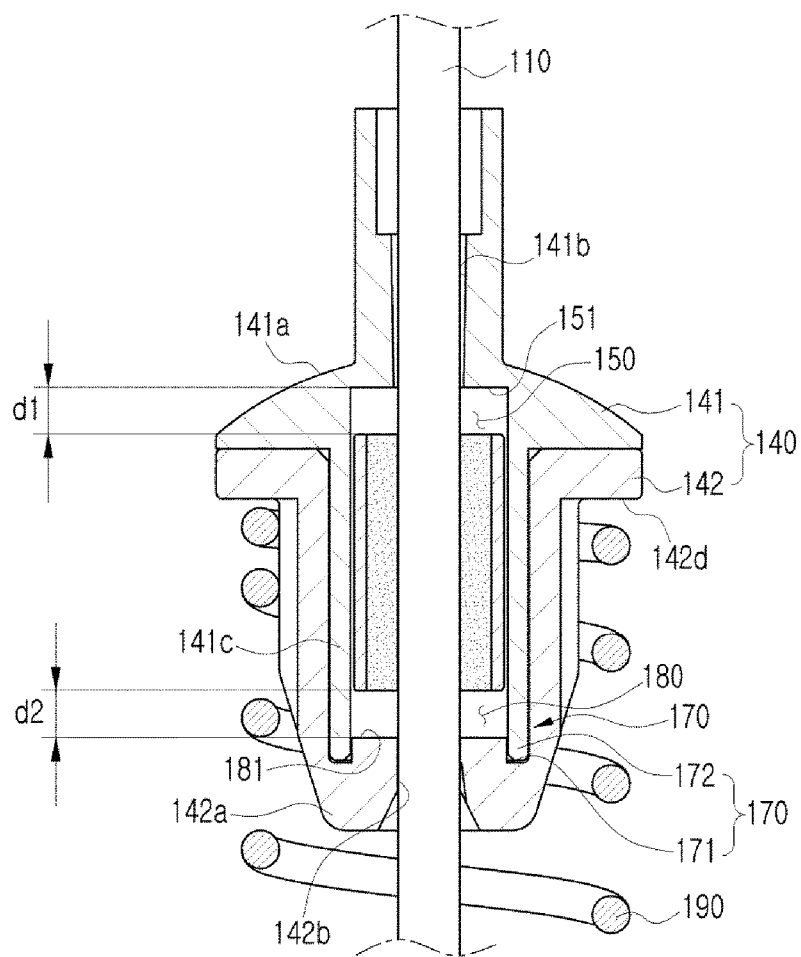
FIG. 4 is an enlarged cross-sectional view illustrating a part of the damping device in accordance with one embodiment of the present disclosure.

FIG. 1 is a cross-sectional view of a washing machine in accordance with one embodiment of the present disclosure. FIGS. 2 to 4 are views of a damping device of the washing machine in accordance with one embodiment of the present disclosure.

As shown in FIG. 1, a washing machine 1 may include a cabinet 10 forming the exterior of the washing machine 1, a tub 11 disposed in the cabinet 10 to store washing water, a washing tub 12 rotatably disposed in the tub 11, and a pulsator 50 disposed in the washing tub 12 to generate water currents.

An opening 24 is formed at a top of the cabinet 10 to allow the laundry to be inserted into the washing tub 12. A top cover 20 is provided at the opening 24.

A door 23 is rotatably installed at a top surface of the top cover 20 to open and close the opening 24. A control unit 21 which includes buttons, etc. for controlling the washing machine 1 may be provided in front or rear of the top cover 20.

A water supply device 17 for supplying washing water to the tub 11 may be installed above the tub 11. The water supply device 17 may include a water supply pipe 17a connected to an external water source (not shown), a detergent supply device 16 provided to allow water to be supplied through the water supply pipe 17a to pass therethrough to be supplied together with a detergent, and a water supply valve 17b installed at the water supply pipe 17a to control the supplied water.

The washing tub 12 may be provided in a cylindrical shape with an open top, and a plurality of spin-drying holes 12a may be formed on a side portion thereof. A balancer 14 provided to allow the washing tub 12 to stably spin while spinning at a high speed may be provided at a top of the washing tub 12.

Below the tub 11, a motor 25 which generates a driving force which allows the washing tub 12 and the pulsator 50 to spin and a power transfer device 26 which simultaneously or selectively transfers the driving force generated by the motor 25 to the washing tub 12 and the pulsator 50.

Here, a hollow type spin-drying shaft 29 may be coupled to the washing tub 12 and a washing shaft 27 installed in a hollow portion of the spin-drying shaft 29 may be coupled to the pulsator 50 through a washing shaft coupling portion 28. The motor 25 may simultaneously or selectively transfer the driving force to the washing tub 12 and the pulsator 50 depending on an elevating operation of the power transfer device 26.

The power transfer device 26 may include an actuator 30 which generates the driving force to transfer power, a load portion 31 which linearly moves along an operation of the actuator 30, and a clutch portion 32 which is connected to the load portion 31 and pivots according to an operation of the load portion 31.

A drainage device 18 for discharging washing water of the tub 11 may be installed below the tub 11. A drainage hole 11a is formed at a bottom of the tub 11 to discharge the washing water stored in the tub 11.

The drainage device 18 may include a first drainage pipe 18a connected to the drainage hole 11a formed at the bottom of the tub 11, a drainage valve 18b installed at the first drainage pipe 18a to control drainage, and a second drainage pipe 18c connected to an outlet of the drainage valve 18b to discharge the washing water to the outside of the cabinet 10.

Meanwhile, the tub 11 may be supported by the cabinet 10 due to a damping device 100.

The damping device 100 may be provided in the cabinet 10 to damp a vibration of the tub 11. In detail, the damping device 100 may be coupled with a first bracket 41 formed at a top corner of an inside of the cabinet 10 and a second bracket 42 formed at a bottom of an outside of the tub 11. The damping device 100 may be provided to damp a vibration and shock transferred from the tub 11. In the embodiment, as an example four of such first brackets 41 are located at corners of the top of the cabinet 10, respectively.

However, the concept of the present disclosure is not limited thereto. For example, positions and numbers of the first brackets 41 and the second brackets 42 are changeable.

As shown in FIGS. 2 to 4, the damping device 100 installed in the washing machine 1 may include a suspension member 110, a damping unit 140 installed at the suspension member 110, a buffering member 190, and a supporting member 130.

A first fixing portion 111 may be formed at a top end of the suspension member 110, and a second fixing portion 112 may be formed at a bottom end thereof. The suspension member 110 may be provided to suspend the tub 11 from the cabinet 10 and may include a suspension bar.

The damping device 100 may further include a fixing member 120. The fixing member 120 may be installed at the top end of the suspension member 110. The fixing member 120 is coupled with the suspension member 110 not to be separated, due to the first fixing portion 111. The fixing member 120 may be coupled with and fixed to the first bracket 41 formed at the cabinet 10. The fixing member 120 may have a top with a greater diameter than that of a bottom and may include a supporting surface 121 formed on an outer surface thereof to be supportable by the first bracket 41.

The damping device 100 may include the supporting member 130. The supporting member 130 may be installed at the bottom end of the suspension member 110. The supporting member 130 is coupled with the suspension member 110 not to be separated, due to the second fixing portion 112.

The damping unit 140 installed at the suspension member 110 may be coupled with an outside of the suspension member 110 to be movable along the suspension member 110. The damping unit 140 is provided to be supported by the second bracket 42 formed at the tub 11 to be movable.

The damping unit 140 includes a first damping portion 141 and a second damping portion 142.

In detail, the damping unit 140 may include the first damping portion 141 disposed above and the second damping portion 142 coupled below with the first damping portion 141.

The first damping portion 141 includes a first damping portion body 141a which forms an exterior. The first damping portion body 141a may include a first through hole 141b formed in a center thereof to allow the suspension member 110 to pass therethrough and to be movably coupled therewith.

A first accommodating portion 150 may be formed in a central portion of the first damping portion body 141a. The first accommodating portion 150 is formed while being connected to the first through hole 141b. Here, the first accommodating portion 150 may be formed greater than a width of the first through hole 141b.

The first accommodating portion 150 may be formed while extending in a longitudinal direction of the suspension member 110. The first damping portion body 141a may include an accommodating portion forming portion 141c formed extending downward. The accommodating portion forming portion 141c may be formed in a cylindrical shape to form the first accommodating portion 150 in a center thereof.

The second damping portion 142 is provided to be coupled from a bottom to a top with the first damping portion 141.

The second damping portion 142 includes a second damping portion body 142a which forms the exterior. The second damping portion body 142a may include a second through hole 142b formed in a center thereof to allow the suspension member 110 to pass therethrough and to be coupled therewith to be movable.

A second accommodating portion 180 may be formed in a central portion of the second damping portion body 142a. The second accommodating portion 180 is formed while being connected to the second through hole 142b. Here, the second accommodating portion 180 may be formed greater than a width of the second through hole 142b.

The second accommodating portion 180 may be formed in the central portion of the second damping portion body 142a while being recessed in the longitudinal direction of the suspension member 110.

The second accommodating portion 180 may be formed greater than a width of the accommodating portion forming portion 141c to accommodate the accommodating portion forming portion 141c which forms the first accommodating portion 150.

The first damping portion 141 and the second damping portion 142 may be coupled with each other by a connection portion 170.

The connection portion 170 may include a connection protrusion 172 formed at the accommodating portion forming portion 141c of the first damping portion 141 and a connection groove 171 formed at the second accommodating portion 180 of the second damping portion 142. The connection protrusion 172 may be formed at a bottom end of the accommodating portion forming portion 141c. The connection groove 171 may be formed at a perimeter of a bottom surface 181 of the second accommodating portion 180.

Accordingly, the accommodating portion forming portion 141c provided to form the first accommodating portion 150 in the first damping portion body 141a may be inserted into the second accommodating portion 180 of the second damping portion body 142a and then the connection protrusion 172 and the connection groove 171 are coupled, thereby coupling the first damping portion 141 with the second damping portion 142.

Here, due to the coupling between the first damping portion 141 and the second damping portion 142, the first accommodating portion 150 is formed in the damping unit 140.

In the embodiment, the connection protrusion 172 which forms the connection portion 170 is integrally formed with the accommodating portion forming portion 141c of the first damping portion body 141a, and the connection groove 171 is integrally formed with the second accommodating portion 180. However, the concept of the present disclosure is not limited thereto. For example, a connection portion may be separately formed from a first damping portion body and a second damping portion body.

Meanwhile, the damping device 100 may further include a friction unit 160 installed at the suspension member 110. The friction unit 160 may be installed at the outside of the suspension member 110 and may be provided in the damping unit 140.

The friction unit 160 may be disposed in the first accommodating portion 150 formed in the damping unit 140.

The friction unit 160 may be provided in the first accommodating portion 150 and may integrally move together with the damping unit 140. Since the damping unit 140 integrally moves together with the tub 11, a frictional force occurs between the friction unit 160 and the suspension member 110 and thus a damping force of the damping device 100 may be increased.

Meanwhile, the friction unit 160 may be disposed while being spaced apart at certain intervals d1 and d2 from an inner surface of the first accommodating portion 150 to be selectively movable according to vibration displacement of the washing tub 12. The friction unit 160 may be provided while being spaced from a top end and a bottom end of the first accommodating portion 150 in a longitudinal direction thereof.

The friction unit 160 may be spaced downward at a first interval d1 from a top surface 151 of the first accommodating portion 150. The friction unit 160 may be spaced upward at a second interval d2 from the bottom surface 181 of the second accommodating portion 180.

The intervals d1 and d2 of the friction unit 160 may stop movement of the friction unit 160 at a high speed spin zone in which the vibration displacement of the washing tub 12 is relatively small during a spin-drying operation of the washing machine 1.

Here, the intervals d1 and d2 of the friction unit 160 may be formed corresponding to vibration displacement of the washing machine 1. The intervals d1 and d2 of the friction unit 160 may be formed corresponding to separation as much as small vibration displacement which occurs in the high speed spin zone of the washing tub 12.

In detail, the frictional force between the friction unit 160 and the suspension member 110 reduces vibration displacement in a transient vibration section of a low speed spin zone in which the vibration displacement is great and driving is performed for a short time during the spin-drying operation. However, vibration transfer to the outside may be increased and then a vibration and noise of the exterior of the washing machine 1 may be generated in a normal vibration section of the high speed spin zone in which the vibration displacement is small and driving is performed for a long time.

Accordingly, when the friction unit 160 is spaced apart at the intervals d1 and d2 from the damping unit 140 in the longitudinal direction, the friction unit 160 does not move and is fixed at the time of a small vibration which occurs in the high speed spin zone of the washing tub 12 not to generate the damping force.

That is, the friction unit 160 may selectively perform depending on the vibration displacement of the washing tub 12.

Here, a separation distance d including the first interval d1 and the second interval d2 may be 10 mm or less. In the embodiment, the intervals d1 and d2 are formed while being symmetrically spaced from the top end and bottom end of the first accommodating portion 150, respectively. However, the concept of the present disclosure is not limited thereto.

Meanwhile, the friction unit 160 may include a first friction member 161 and a second friction member 162.

The first friction member 161 may include felt.

The first friction member 161 is formed to allow a felt panel to surround the outside of the suspension member 110. The second friction member 162 is provided at an outside of the first friction member 161 to support the first friction member 161.

The second friction member 162 may be formed in a cylindrical shape or a tube shape. The second friction member 162 may include a plastic or rubber material.

The second friction member 162 allows the first friction member 161 to be provided therein. The second friction member 162 and the first friction member 161 may be provided while press-fitting on the outside of the suspension member 110. The first friction member 161 and the second friction member 162 may generate a frictional force with the suspension member 110 due to the vibration and shock transferred from the tub 11.

Meanwhile, the damping device 100 may further include the buffering member 190.

The buffering member 190 may be provided between the second damping portion 142 disposed at a bottom of the damping unit 140 and the supporting member 130. The buffering member 190 may contract or relax due to the vibration and shock transferred from the tub 11, thereby buffering the vibration and shock.

The second damping portion body 142a of the second damping portion 142 includes a buffering member supporting portion 142d to allow the buffering member 190 to be coupled.

One end of the buffering member 190 may be coupled with and fixed to the supporting member 130 and the other end thereof may be fixed to the buffering member supporting portion 142d of the second damping portion 142 and may move along the suspension member 110 while being integrated with the damping unit 140.

The buffering member 190 may include an elastic material to be changeable in length depending on movement of the damping unit 140. The buffering member 190 may include a spring. In the embodiment, the buffering member 190 is at least partially inserted into the second damping portion body 142a and is fixed to the buffering member supporting portion 142d as an example. However, the concept of the present disclosure is not limited thereto.

Damping the vibration of the tub 11 by the damping device 100 will be described as follows.

During an operation and the spin-drying operation of the washing machine 1, the vibration transferred from the tub 11 is transferred to the damping unit 140 through the second bracket 42 and the vibration transferred to the damping unit 140 is transferred to the buffering member 190 to be buffered by the contract and relax movements of the buffering member 190.

Also, an extra vibration not buffered by the buffering member 190 is transferred to the second fixing portion 112 and the suspension member 110 through the supporting member 130. The extra vibration may be transferred to the first fixing portion 111 of the suspension member 110 and the first bracket 41 of the cabinet 10, thereby being exhausted.

Also, the friction unit 160 provided in the damping unit 140 may move together with the damping unit 140, and may give the frictional force to the suspension member 110 to more increase a buffering effect.

Meanwhile, in the case of a vibration in a high speed spin zone of the washing machine 1, only the damping unit 140 may move and the friction unit 160 may not move, thereby generating no damping force.

Figure 5:
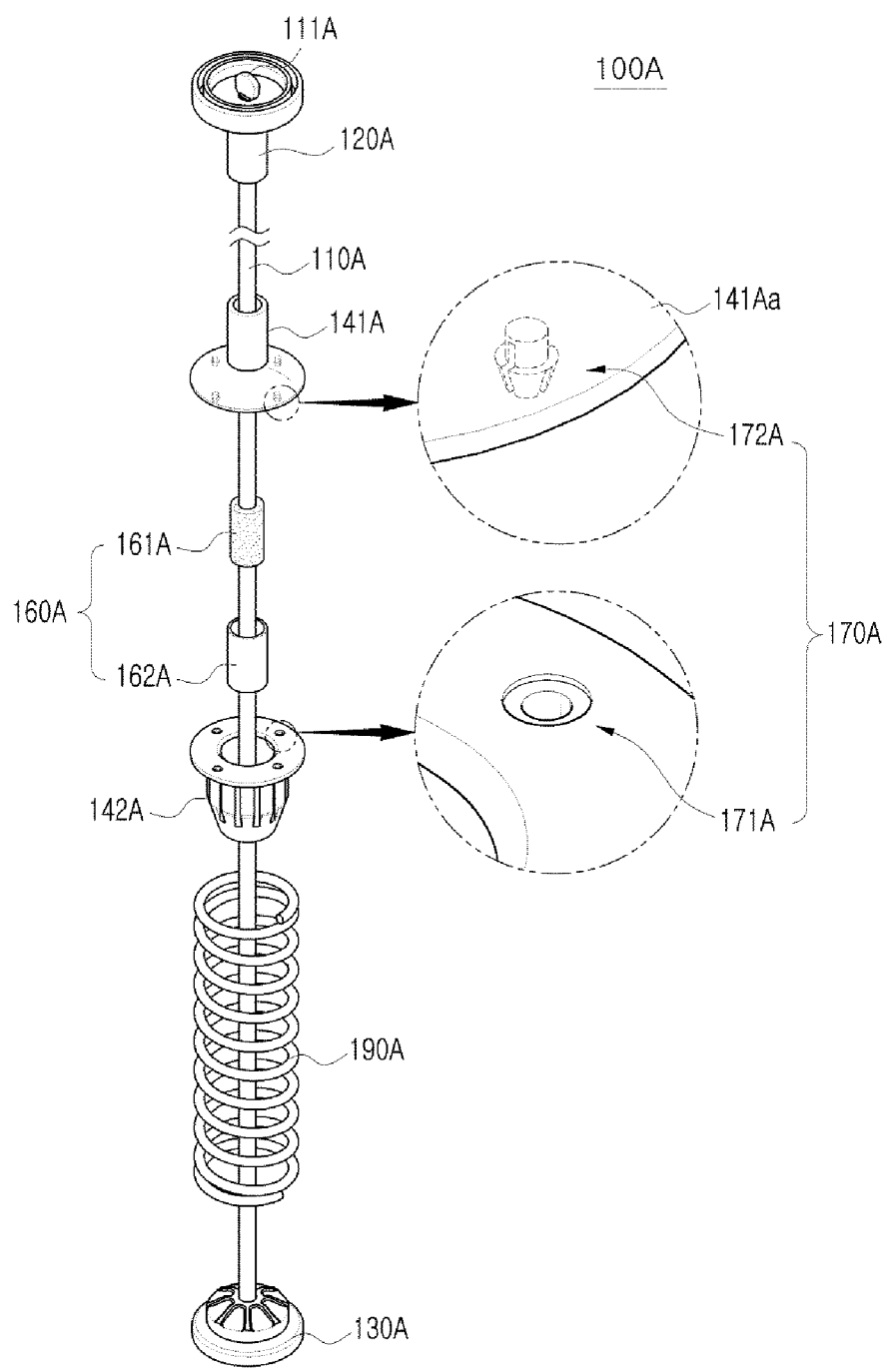
FIG. 5 is an exploded perspective view of a damping device in accordance with another embodiment of the present disclosure.
Figure 6:
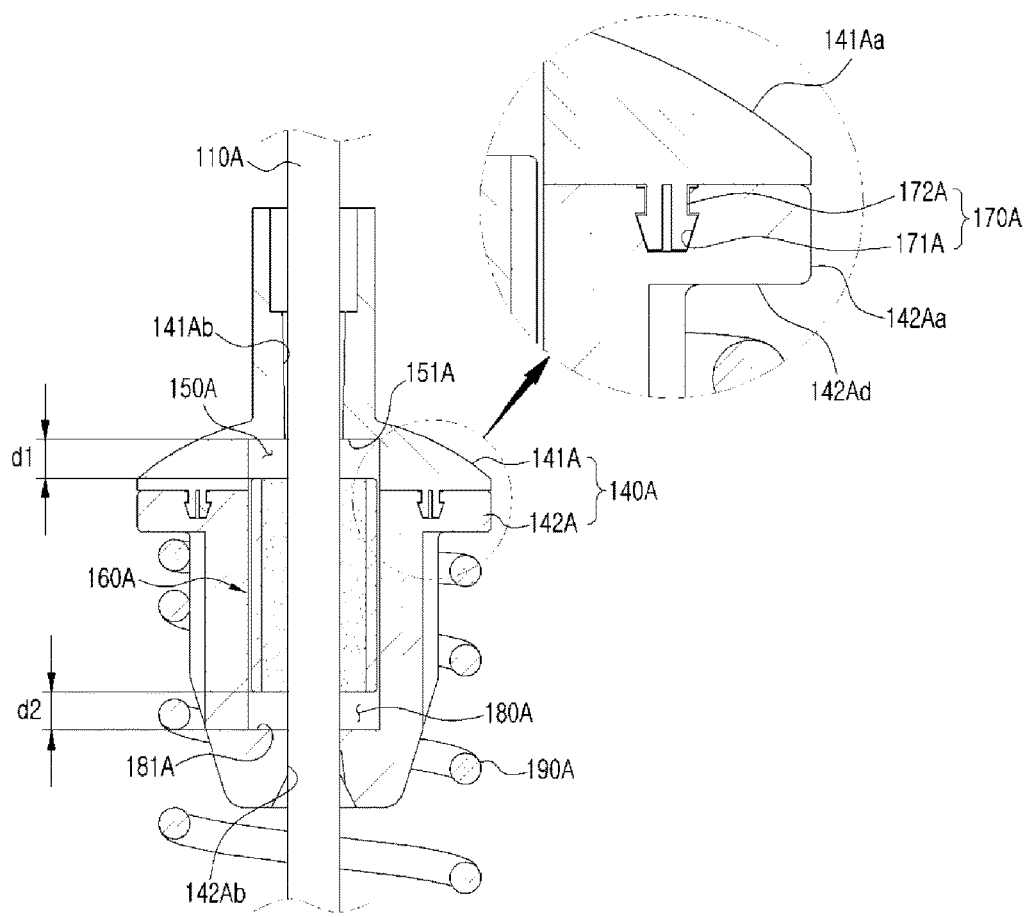
FIG. 6 is an enlarged cross-sectional view illustrating a part of the damping device in accordance with another embodiment of the present disclosure.

FIG. 5 is an exploded perspective view of a damping device in accordance with another embodiment of the present disclosure. FIG. 6 is an enlarged cross-sectional view illustrating a part of the damping device in accordance with another embodiment of the present disclosure. Reference numerals not shown in the drawings refer to FIGS. 1 to 4.

As shown in FIGS. 5 to 6, a damping device 100A installed in the washing machine 1 may include a suspension member 110A, a damping unit 140A installed at the suspension member 110A, a buffering member 190A, and a supporting member 130A.

A first fixing portion 111A may be formed at a top end of the suspension member 110A, and the second fixing portion 112 may be formed at a bottom end thereof.

The damping device 100A may further include a fixing member 120A. The fixing member 120A may be installed at the top end of the suspension member 110A.

The damping device 100A may further include the supporting member 130A. The supporting member 130A may be installed at the bottom end of the suspension member 110A. The supporting member 130A is coupled with the suspension member 110A not to be separated, due to the second fixing portion 112.

The damping unit 140A installed at the suspension member 110A may be coupled with an outside of the suspension member 110A to be movable along the suspension member 110A.

The damping unit 140A includes a first damping portion 141A and a second damping portion 142A.

In detail, the damping unit 140A may include the first damping portion 141A disposed above and the second damping portion 142A coupled below with the first damping portion 141A.

The first damping portion 141A includes a first damping portion body 141Aa which forms an exterior. The first damping portion body 141Aa may include a first through hole 141Ab formed in a center thereof to allow the suspension member 110A to pass therethrough and to be coupled therewith to be movable.

A first accommodating portion 150A may be formed in a central portion of the first damping portion body 141Aa. The first accommodating portion 150A is formed while being connected to the first through hole 141Ab. Here, the first accommodating portion 150A may be formed greater than a width of the first through hole 141Ab.

The first accommodating portion 150A may be formed while extending in a longitudinal direction of the suspension member 110A.

The second damping portion 142A is coupled below with the first damping portion 141A.

The second damping portion 142A includes a second damping portion body 142Aa which forms the exterior. The second damping portion body 142Aa may include a second through hole 142Ab formed in a center thereof to allow the suspension member 110A to pass therethrough and to be coupled therewith to be movable.

A second accommodating portion 180A may be formed in a central portion of the second damping portion body 142Aa. The second accommodating portion 180A is formed while being connected to the second through hole 142Ab. Here, the second accommodating portion 180A may be formed greater than a width of the second through hole 142Ab.

The second accommodating portion 180A may be formed in the central portion of the second damping portion body 142Aa while being recessed in the longitudinal direction of the suspension member 110A.

The second accommodating portion 180A may be formed corresponding to the first accommodating portion 150A.

Here, the first damping portion 141A and the second damping portion 142A may be coupled by a connection portion 170A.

The connection portion 170A may include a connection protrusion 172A formed at the first damping portion 141A and a connection groove 171A formed at the second damping portion 142A.

The connection protrusion 172A may be formed at a bottom surface of the first damping portion body 141Aa while protruding downward. The connection protrusion 172A may have a hook shape.

The connection groove 171A may be formed at a top surface of the second damping portion body 142Aa. The connection groove 171A and the connection protrusion 172A may be formed at mutually corresponding position in corresponding number. In the embodiment, the connection portion 170A includes four connection protrusions 172A and four connection grooves 171A as an example. However, the concept of the present disclosure is not limited thereto. For example, a shape and number of a connection portion may be variously configured depending on a size and shape of a damping unit.

Accordingly, the connection protrusion 172A of the first damping portion body 141Aa may be coupled with the connection groove 171A of the second damping portion body 142Aa, thereby coupling the first damping portion 141A with the second damping portion 142A.

Due to the coupling between the first damping portion 141A and the second damping portion 142A, the first accommodating portion 150A and the second accommodating portion 180A are formed in the damping unit 140A. The first accommodating portion 150A and the second accommodating portion 180A are formed while being connected to each other.

As described above, a friction unit 160A may be provided at the first accommodating portion 150A and the second accommodating portion 180A in the damping unit 140A.

The friction unit 160A may be provided in the first accommodating portion 150A and the second accommodating portion 180A and may integrally move together with the damping unit 140A. Since the damping unit 140A integrally moves together with the tub 11, a frictional force occurs between the friction unit 160A and the suspension member 110A and thus a damping force of the damping device 100A may be increased.

Meanwhile, the friction unit 160A may be disposed while being spaced apart at certain intervals d1 and d2 from inner surfaces of the first accommodating portion 150A and the second accommodating portion 180A to be selectively movable according to vibration displacement of the washing tub 12. The friction unit 160A may be provided while being spaced from a top end and a bottom end of the first accommodating portion 150A in a longitudinal direction thereof.

The friction unit 160A may be spaced downward at a first interval d1 from a top surface 151A of the first accommodating portion 150A. The friction unit 160A may be spaced upward at a second interval d2 from a bottom surface 181A of the second accommodating portion 180A.

The intervals d1 and d2 of the friction unit 160A may allow movement of the friction unit 160A to be stopped at a high speed spin zone in which the vibration displacement of the washing tub 12 is relatively small during the spin-drying operation of the washing machine 1.

Here, the intervals d1 and d2 of the friction unit 160A may be formed corresponding to the vibration displacement of the washing tub 12. The intervals d1 and d2 of the friction unit 160A may be formed corresponding to separation as much as small vibration displacement which occurs in the high speed spin zone of the washing tub 12.

In detail, the frictional force between the friction unit 160A and the suspension member 110A reduces vibration displacement in a transient vibration section of a low speed spin zone in which the vibration displacement is great and driving is performed for a short time during the spin-drying operation. However, vibration transfer to the outside may be increased and then a vibration and noise of the exterior of the washing machine 1 may be generated in a normal vibration section of the high speed spin zone in which the vibration displacement is small and driving is performed for a long time.

Accordingly, when the friction unit 160A is spaced apart at the intervals d1 and d2 from the damping unit 140A in the longitudinal direction, the friction unit 160A does not move and is fixed at the time of a small vibration which occurs in the high speed spin zone of the washing tub 12 not to generate the damping force.

That is, the friction unit 160A may selectively perform depending on the vibration displacement of the washing tub 12.

Here, a separation distance d including the first interval d1 and the second interval d2 may be 10 mm or less.

Meanwhile, the friction unit 160A may include a first friction member 161A and a second friction member 162A.

The first friction member 161A may include felt.

The first friction member 161A is formed to allow a felt panel to surround the outside of the suspension member 110A. The second friction member 162A is provided at an outside of the first friction member 161A to support the first friction member 161A.

The second friction member 162A may be formed in a cylindrical shape or a tube shape. The second friction member 162A may include a plastic or rubber material.

The second friction member 162A allows the first friction member 161A to be provided therein. The second friction member 162A and the first friction member 161A may be provided while press-fitting on the outside of the suspension member 110A. The first friction member 161A and the second friction member 162A may generate a frictional force with the suspension member 110A due to a vibration and shock transferred from the tub 11.

A vibration damping operation of the damping device 100A provided by disposing the friction unit 160A which includes the first friction member 161A and the second friction member 162A to be spaced from the first accommodating portion 150A and the second accommodating portion 180A is identical to that of the damping device 100 in accordance with one embodiment of the present disclosure. Hereinafter, a repetitive description will be omitted.

Figure 7:
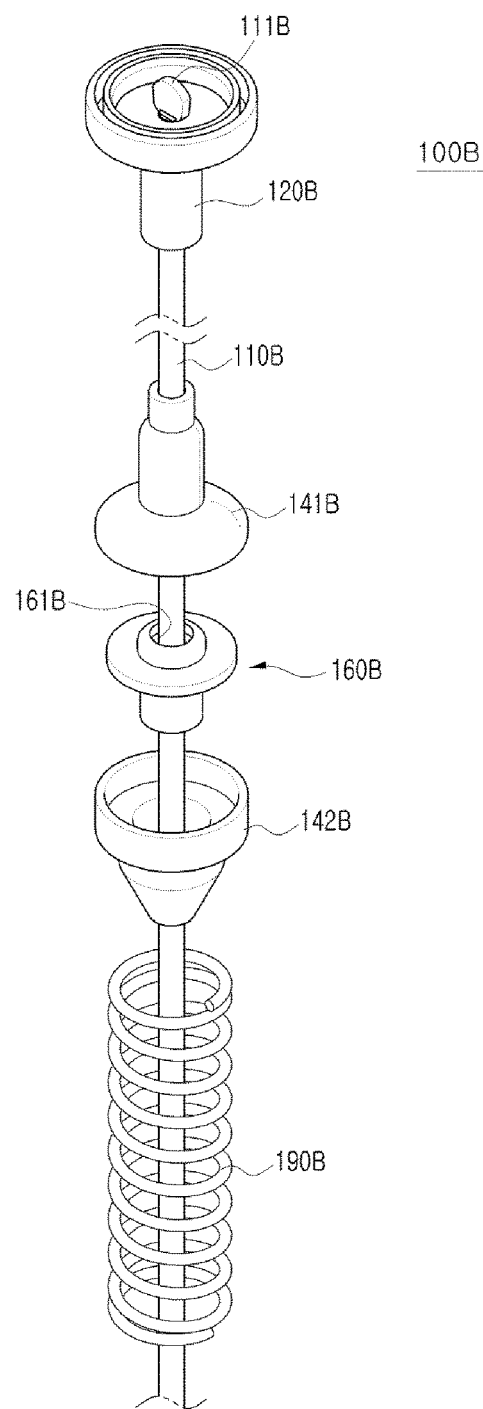
FIG. 7 is an exploded perspective view of a damping device in accordance with still another embodiment of the present disclosure.
Figure 8:
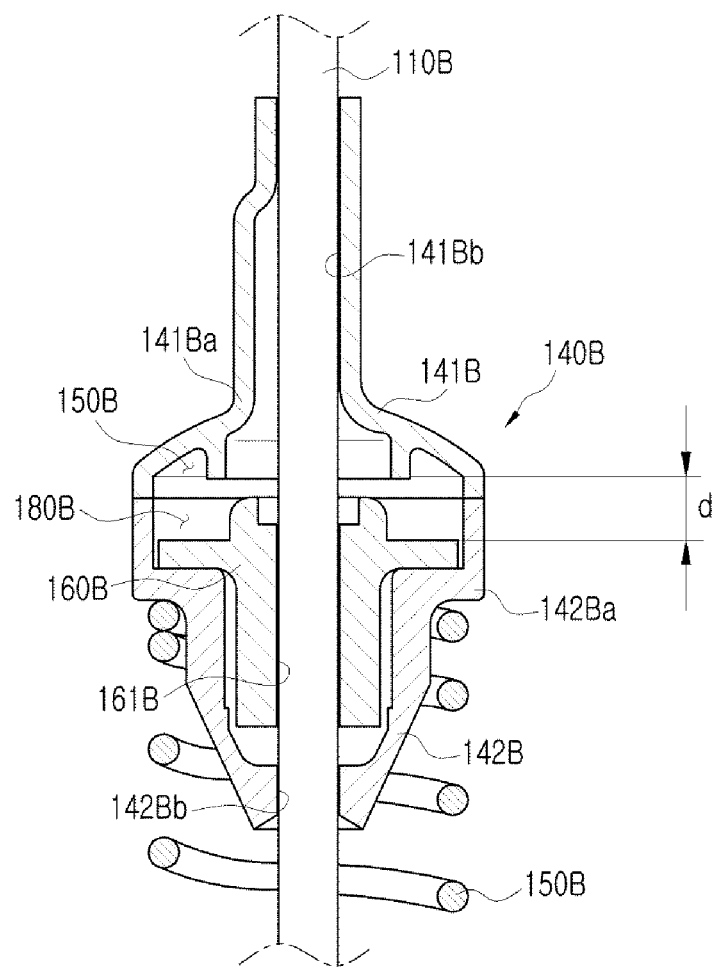
FIG. 8 is an enlarged cross-sectional view illustrating a part of the damping device in accordance with still another embodiment of the present disclosure.

FIG. 7 is an exploded perspective view of a damping device in accordance with still another embodiment of the present disclosure. FIG. 8 is an enlarged cross-sectional view illustrating a part of the damping device in accordance with still another embodiment of the present disclosure.

As shown in FIGS. 7 and 8, a damping device 100B may include a suspension member 110B, a cap 141B installed to be movable along the suspension member 110B, a cover 142B installed to be coupled below with the cap 141B and to be movable integrally with the suspension member 110B, a buffering member 190B, and a supporting member 130B.

The cap 141B and the cover 142B installed at the suspension member 110B may be coupled with an outside of the suspension member 110B to be movable along the suspension member 110B.

The cap 141B may be disposed at a top of the suspension member 110B and the cover 142B may be coupled below with the cap 141B.

The cap 141B includes a cap body 141Ba which forms an exterior. The cap body 141Ba may include a first through hole 141Bb formed in a center thereof to allow the suspension member 110B to pass therethrough and to be coupled therewith to be movable.

A first accommodating portion 150B may be formed in the cap body 141Ba. The first accommodating portion 150B is formed while being connected to the first through hole 141Bb. Here, the first accommodating portion 150B may be formed greater than a width of the first through hole 141Bb.

The cover 142B includes a cover body 142Ba which forms the exterior. The cover body 142Ba may include a second through hole 142Bb formed in a center thereof to allow the suspension member 110B to pass therethrough and to be coupled therewith to be movable.

A second accommodating portion 180B may be formed in a central portion of the cover body 142Ba. The second accommodating portion 180B is formed while being connected to the second through hole 142Bb. Here, the second accommodating portion 180B may be formed greater than a width of the second through hole 142Bb.

The second accommodating portion 180B may be formed in the central portion of the cover body 142Ba while being recessed in a longitudinal direction of the suspension member 110B.

A bottom end of the cap body 141Ba may be formed to be corresponding to and coupled with a top end of the cover body 142Ba.

Due to coupling between the cap body 141Ba and the cover body 142Ba, the first accommodating portion 150B and the second accommodating portion 180B are formed therein. The first accommodating portion 150B and the second accommodating portion 180B are formed while being connected to each other. The cap body 141Ba and the cover body 142Ba may be coupled with adhesion.

As described above, a friction unit 160B may be provided in the first accommodating portion 150B and the second accommodating portion 180B formed by coupling between the cap body 141Ba and the cover body 142Ba.

The friction unit 160B may be provided in the first accommodating portion 150B and the second accommodating portion 180B and may integrally move together with the cap 141B and the cover 142B. Since the friction unit 160B integrally moves together with the cap 141B, the cover 142B, and the tub 11, a frictional force occurs between the friction unit 160B and the suspension member 110B and thus a damping force of the damping device 100B may be increased.

The friction unit 160B may include a rubber material. The friction unit 160B may include a through hole 161B formed in a center thereof to allow the suspension member 110B to pass and to be movable therethrough.

Also, the friction unit 160B may be disposed while being spaced apart at a certain interval d from inner surfaces of the first accommodating portion 150B and the second accommodating portion 180B to be selectively movable according to vibration displacement of the washing tub 12.

The friction unit 160B may be provided while being spaced downward from a top end of the first accommodating portion 150B in the longitudinal direction of the suspension member 110B.

The interval d of the friction unit 160B may allow movement of the friction unit 160B to be stopped at a high speed spin zone in which the vibration displacement of the washing tub 12 is relatively small during the spin-drying operation of the washing machine 1.

Here, the interval d of the friction unit 160B may be formed corresponding to the vibration displacement of the washing tub 12. The interval d of the friction unit 160B may be formed corresponding to separation as much as small vibration displacement which occurs in the high speed spin zone of the washing tub 12.

In detail, the frictional force between the friction unit 160B and the suspension member 110B reduces vibration displacement in a transient vibration section of a low speed spin zone in which the vibration displacement is great and driving is performed for a short time during the spin-drying operation. However, vibration transfer to the outside may be increased and then a vibration and noise of the exterior of the washing machine 1 may be generated in a normal vibration section of the high speed spin zone in which the vibration displacement is small and driving is performed for a long time.

Accordingly, when the friction unit 160B is spaced apart at the interval d from the top end of the first accommodating portion 150B formed by the cap 141B and the cover 142B in the longitudinal direction, the friction unit 160B does not move and is fixed at the time of a small vibration which occurs in the high speed spin zone of the washing tub 12 not to generate the damping force.

That is, the friction unit 160B may selectively perform depending on the vibration displacement of the washing tub 12.

Meanwhile, since it is possible to fully perceive a vibration damping operation of the damping device 100B performed by components described above from the above description, a repetitive description will be omitted.

Figure 9:
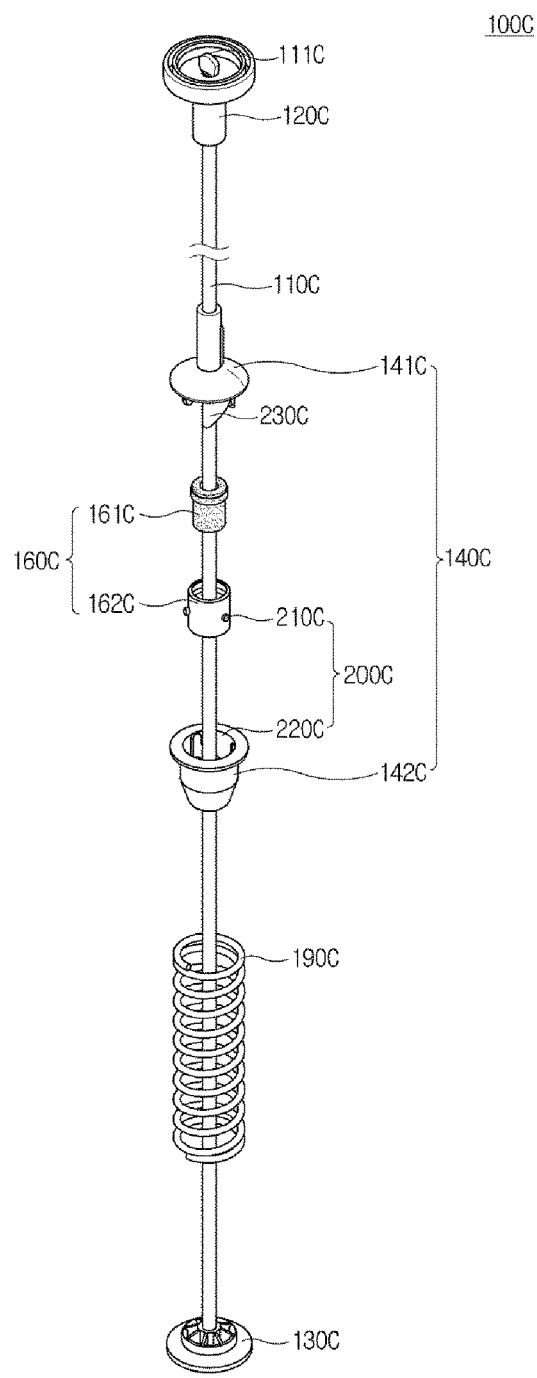
FIG. 9 is an exploded perspective view of a damping device in accordance with yet another embodiment of the present disclosure.
Figure 10:
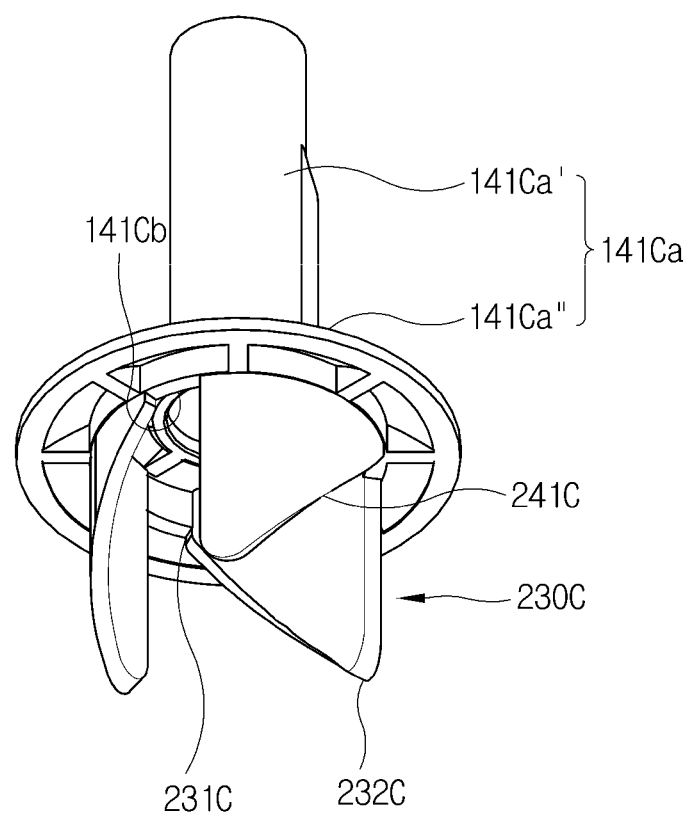
FIG. 10 is a view of a first damping portion of a damping unit at which a first guide portion is provided in accordance with yet another embodiment of the present disclosure.
Figure 11:
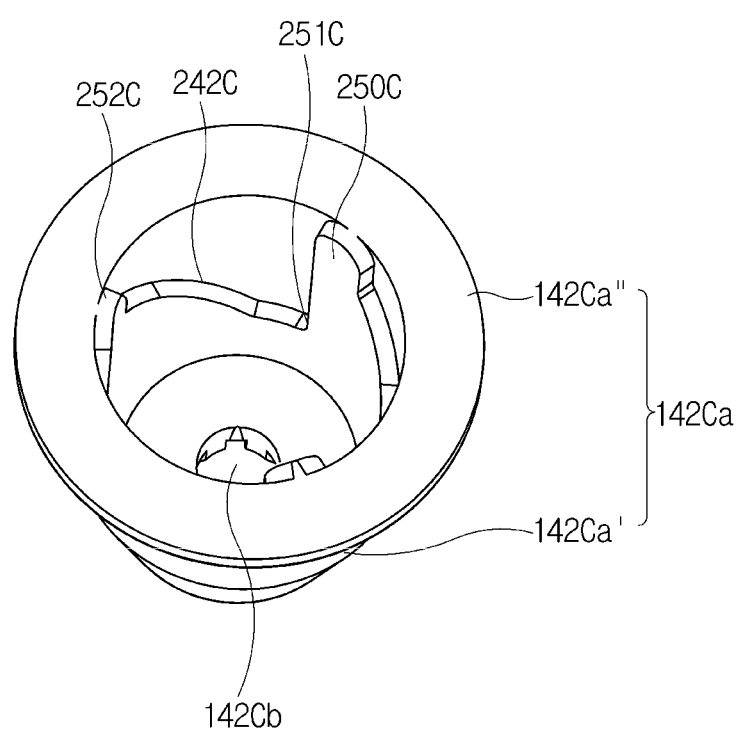
FIG. 11 is a view of a second damping portion of the damping unit at which a second guide portion is provided in accordance with yet another embodiment of the present disclosure.
Figure 12:
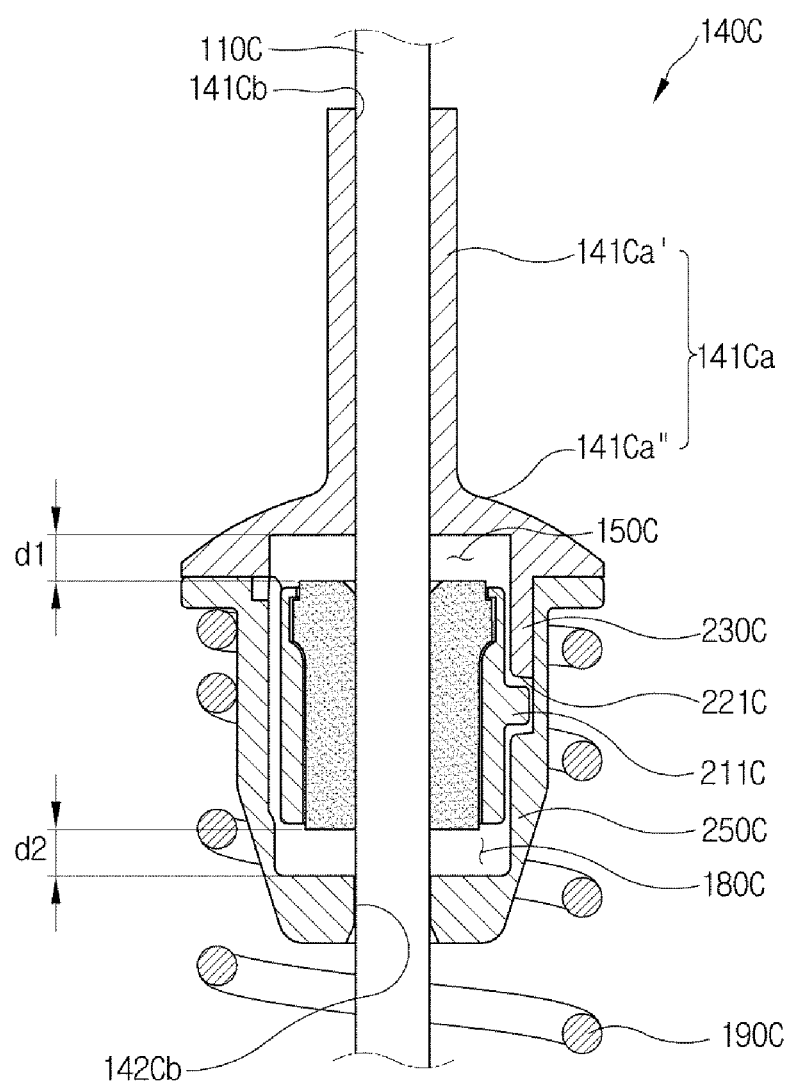
FIG. 12 is a cross-sectional view of the damping unit in accordance with yet another embodiment of the present disclosure.
Figure 13:
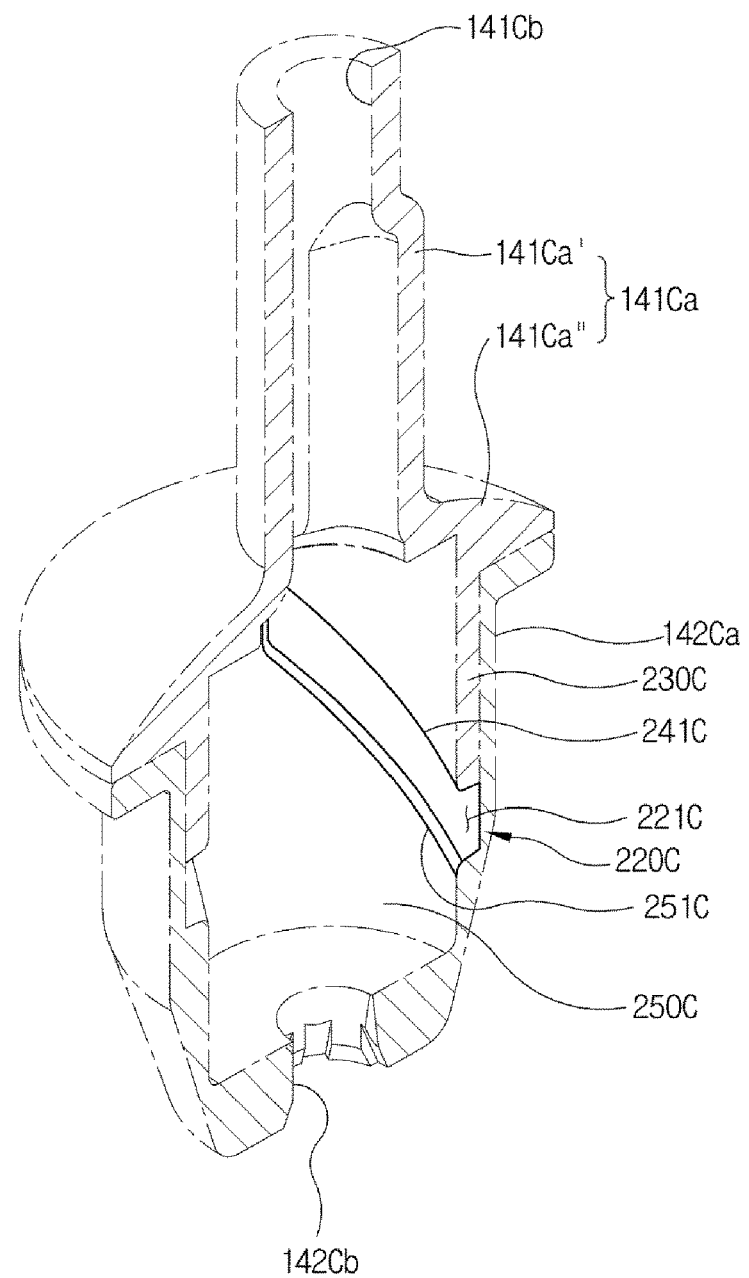
FIG. 13 is a view of a guide groove of the damping unit in accordance with yet another embodiment of the present disclosure.
Figure 14:
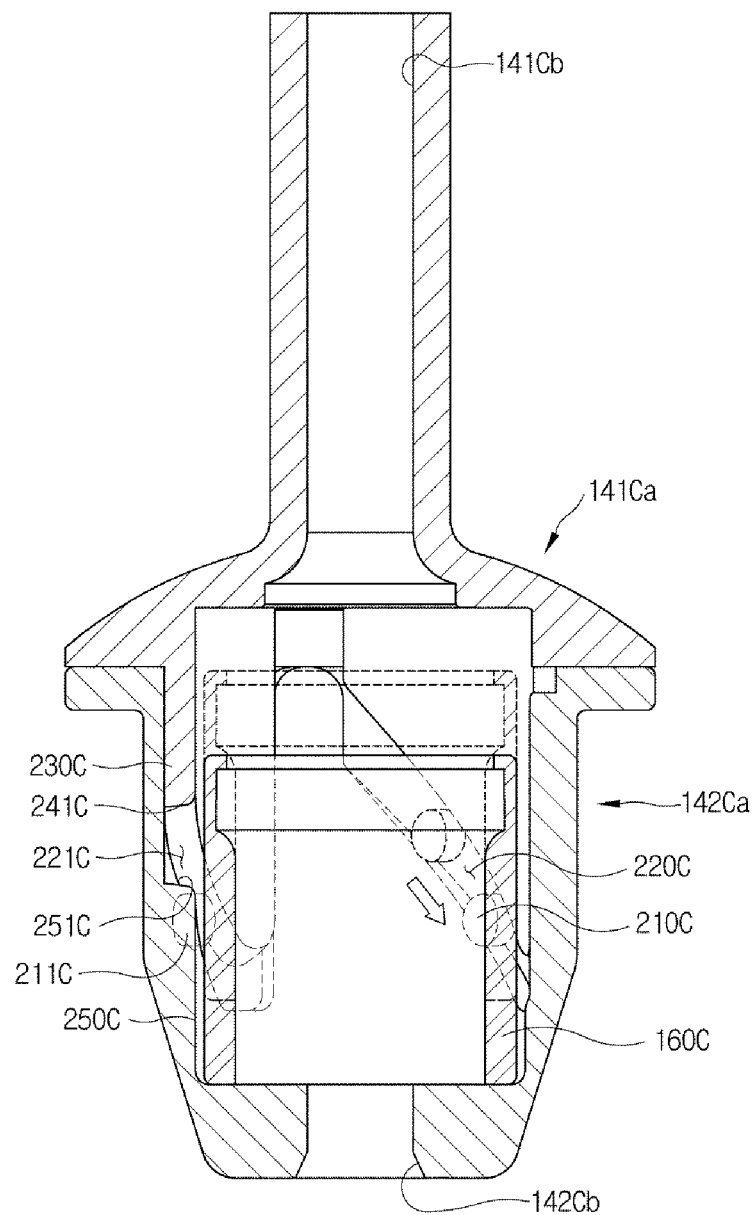
FIG. 14 is a view illustrating a rotating operation of a guide portion in accordance with yet another embodiment of the present disclosure.

FIG. 9 is an exploded perspective view of a damping device in accordance with yet another embodiment of the present disclosure. FIG. 10 is a view of a first damping portion of a damping unit at which a first guide portion is provided in accordance with yet another embodiment of the present disclosure. FIG. 11 is a view of a second damping portion of the damping unit at which a second guide portion is provided in accordance with yet another embodiment of the present disclosure. FIG. 12 is a cross-sectional view of the damping unit in accordance with yet another embodiment of the present disclosure. FIG. 13 is a view of a guide groove of the damping unit in accordance with yet another embodiment of the present disclosure. FIG. 14 is a view illustrating a rotating operation of a guide portion in accordance with yet another embodiment of the present disclosure. Reference numerals not shown in the drawings refer to FIGS. 1 to 8.

As shown in FIGS. 9 to 14, a damping device 100C may include a suspension member 110C, a damping unit 140C installed at the suspension member 110C, a buffering member 190C, and a supporting member 130C.

The suspension member 110C may include a first fixing portion 111C at a top end and the second fixing portion 112 at a bottom end. The suspension member 110C may be provided to suspend the tub 11 from the cabinet 10 and may include a suspension bar.

A fixing member 120C may be installed at the top end of the suspension member 110C and may be prevented from being separated from the suspension member 110C by the first fixing portion 111C. The supporting member 130C may be installed at the bottom end of the suspension member 110C and may be prevented from being separated from the suspension member 110C by the second fixing portion 112.

The damping unit 140C is coupled with an outside of the suspension member 110C to be movable along the suspension member 110C.

The damping unit 140C includes a first damping portion 141C and a second damping portion 142C. The damping unit 140C may include the first damping portion 141C disposed above and the second damping portion 142C coupled below with the first damping portion 141C.

The first damping portion 141C and the second damping portion 142C may include a first through hole 141Cb and a second through hole 142Cb, respectively, to allow the suspension member 110C to pass through centers thereof.

The first damping portion 141C includes a first damping portion body 141Ca which forms an exterior. The first through hole 141Cb is formed while vertically passing through a center of the first damping portion body 141Ca.

The first damping portion body 141Ca includes a first portion 141Ca' at which the first through hole 141Cb is formed to surround the outside of the suspension member 110C and a second portion 141Ca" formed extending below the first portion 141Ca'.

A first accommodating portion 150C may be formed in a central portion of the second portion 141Ca" of the first damping portion body 141Ca. The second portion 141Ca" of the first damping portion body 141Ca may be connected to the first through hole 141Cb. Here, the first accommodating portion 150C may be formed greater than a width of the first through hole 141Cb.

The first accommodating portion 150C may be formed in a longitudinal direction of the suspension member 110C.

The second damping portion 142C is provided to be coupled below with the first damping portion 141C. The second damping portion 142C includes a second damping portion body 142Ca which forms the exterior. The second damping portion body 142Ca may include, in a central portion thereof, a first portion 142Ca' which forms a second accommodating portion 180C and a second portion 142Ca" provided to form a top end edge of the first portion 142Ca' and to be coupled with the first portion 141Ca' of the first damping portion 141C.

Here, the second accommodating portion 180C of the second damping portion 142C may be formed greater than a width of the second through hole 142Cb.

The first accommodating portion 150C of the first damping portion 141C and the second accommodating portion 180C of the second damping portion 142C may be formed corresponding to each other.

A friction unit 160C may be provided in the first accommodating portion 150C and the second accommodating portion 180C formed by coupling between the first damping portion 141C and the second damping portion 142C.

The friction unit 160C may be installed at the outside of the suspension member 110C and may be provided in the damping unit 140C. The friction unit 160C may be provided in the first accommodating portion 150C and the second accommodating portion 180C and may be movable integrally with the damping unit 140C.

Since the damping unit 140C integrally moves together with the tub 11, a frictional force occurs between the friction unit 160C and the suspension member 110C and thus a damping force of the damping device 100C may be increased.

Meanwhile, to be selectively movable according to vibration displacement of the washing tub 12, the friction unit 160C may be disposed while spaced at a certain interval d1 from the first accommodating portion 150C and at a certain interval d2 from the second accommodating portion 180C. The intervals d1 and d2 of the friction unit 160C are provided to allow movement of the friction unit 160C to be stopped at a high speed spin zone in which the vibration displacement of the washing tub 12 is relatively small during the spin-drying operation of the washing machine 1.

Here, the intervals d1 and d2 of the friction unit 160C may be formed corresponding to vibration displacement of the washing machine 1. The intervals d1 and d2 of the friction unit 160C may be formed corresponding to separation as much as small vibration displacement which occurs in the high speed spin zone of the washing tub 12.

In detail, the frictional force between the friction unit 160C and the suspension member 110C reduces vibration displacement in a transient vibration section of a low speed spin zone in which the vibration displacement is great and driving is performed for a short time during the spin-drying operation. However, vibration transfer to the outside may be increased and then a vibration and noise of the exterior of the washing machine 1 may be generated in a normal vibration section of the high speed spin zone in which the vibration displacement is small and driving is performed for a long time.

Accordingly, when the friction unit 160C is spaced apart at the intervals d1 and d2 from the damping unit 140C in a longitudinal direction, the friction unit 160C does not move and is fixed at the time of a small vibration which occurs in the high speed spin zone of the washing tub 12 not to generate the damping force.

The friction unit 160C may include a first friction member 161C and a second friction member 162C.

The first friction member 161C may include felt. The first friction member 161C is formed to allow a felt panel to surround the outside of the suspension member 110C. The second friction member 162C is provided at an outside of the first friction member 161C to support the first friction member 161C.

The second friction member 162C may include a cylinder or a tube. The second friction member 162C may include a plastic or rubber material.

The second friction member 162C and the first friction member 161C may be provided while press-fitting on the outside of the suspension member 110C. The first friction member 161C and the second friction member 162C may generate a frictional force with the suspension member 110C due to a vibration and shock transferred from the tub 11.

Meanwhile, the damping unit 140C may further include a guide portion 200C provided to be selectively rotatable and movable according to a level of a vibration of the washing tub 12.

The guide portion 200C may include a first guide portion 210C provided at the friction unit 160C and a second guide portion 220C provided to guide movement of the first guide portion 210C.

The first guide portion 210C may be provided at the second friction member 162C of the friction unit 160C. The first guide portion 210C may include at least one guide protrusion 211C which protrudes from a center of an outer circumferential surface of the second friction member 162C.

The second guide portion 220C may be provided at at least one of the first damping portion 141C and the second damping portion 142C. The second guide portion 220C may include a guide groove 221C formed to allow the guide protrusion 211C of the first guide portion 210C to be coupled therewith. The guide groove 221C may be tilted in a circumferential direction to allow the guide protrusion 211C to be coupled and to be rotatable and vertically movable.

The guide groove 221C may include at least one spiral shape. The guide groove 221C and guide protrusion 211C may have the same size and number. In the embodiment, three guide protrusions 211C are formed on the outer circumferential surface of the second friction member 162C at intervals of 120 degrees as an example. However, the concept of the present disclosure is not limited thereto. For example, three or more or less guide protrusions may be formed. Here, the same number of guide grooves may be formed corresponding to the guide protrusions.

The second guide portion 220C may include a first guide groove forming portion 230C provided at the first damping portion 141C and a second guide groove forming portion 250C provided at the second damping portion 142C.

The first guide groove forming portion 230C is formed at the second portion 141Ca" of the first damping portion 141C in a downward direction. The first guide groove forming portion 230C may be coupled with the second guide groove forming portion 250C while being spaced apart at a certain interval from the second guide groove forming portion 250C. The first guide groove forming portion 230C and the second guide groove forming portion 250C may include a first tilting portion 241C and a second tilting portion 242C correspondingly provided to form the guide groove 221C therebetween, respectively.

The first tilting portion 241C may be formed at the first guide groove forming portion 230C, and the second tilting portion 242C may be formed at the second guide groove forming portion 250C.

The guide groove 221C may be formed between the first tilting portion 241C and the second tilting portion 242C.

The first tilting portion 241C may be formed between one end 231C and the other end 232C of the first guide groove forming portion 230C. The first tilting portion 241C may extend in a circumferential direction to form a length of the other end 232C to be greater than a length of the one end 231C.

The second tilting portion 242C may be formed between one end 251C and the other end 252C of the second guide groove forming portion 250C. The second tilting portion 242C may extend in a circumferential direction to form a length of the other end 252C to be greater than a length of the one end 251C.

Accordingly, the guide protrusion 211C which forms the first guide portion 210C of the friction unit 160C is guided by the guide groove 221C which forms the second guide portion 220C of the damping unit 140C to be rotatable around and vertically movable along the outside of the suspension member 110C.

Damping of the vibration of the tub 11 by the damping device 100C as described above will be described.

During an operation and the spin-drying operation of the washing machine 1, the vibration transferred from the tub 11 is transferred to the damping unit 140C through the second bracket 42 and the vibration transferred to the damping unit 140C is transferred to the buffering member 190C to be buffered by the contract and relax movements of the buffering member 190C.

Also, an extra vibration not buffered by the buffering member 190C is transferred to the second fixing portion 112 and the suspension member 110C through the supporting member 130C. The extra vibration may be transferred to the first fixing portion 111C of the suspension member 110C and the first bracket 41 of the cabinet 10, thereby being exhausted.

Here, the friction unit 160C provided in the damping unit 140C may vertically move and rotate together with the damping unit 140C to give a frictional force to the suspension member 110C and to increase a buffering effect.

Figure 15:
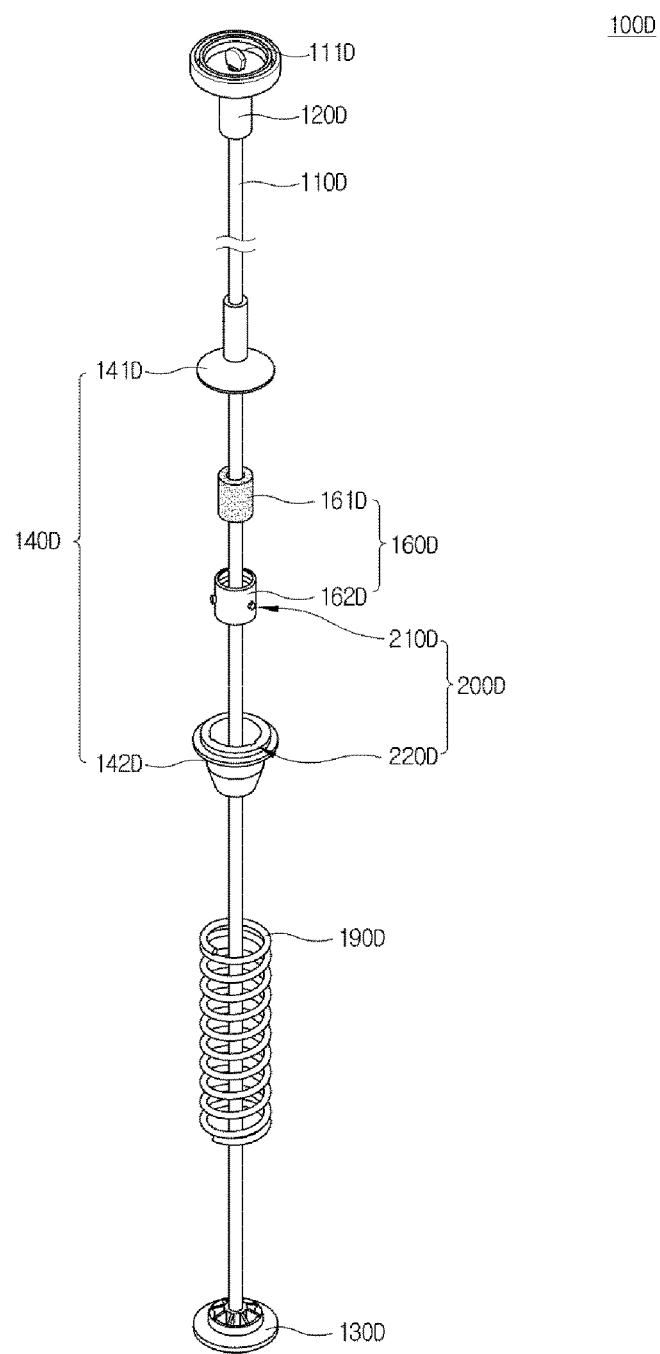
FIG. 15 is an exploded perspective view of a damping device in accordance with even another embodiment of the present disclosure.
Figure 16:
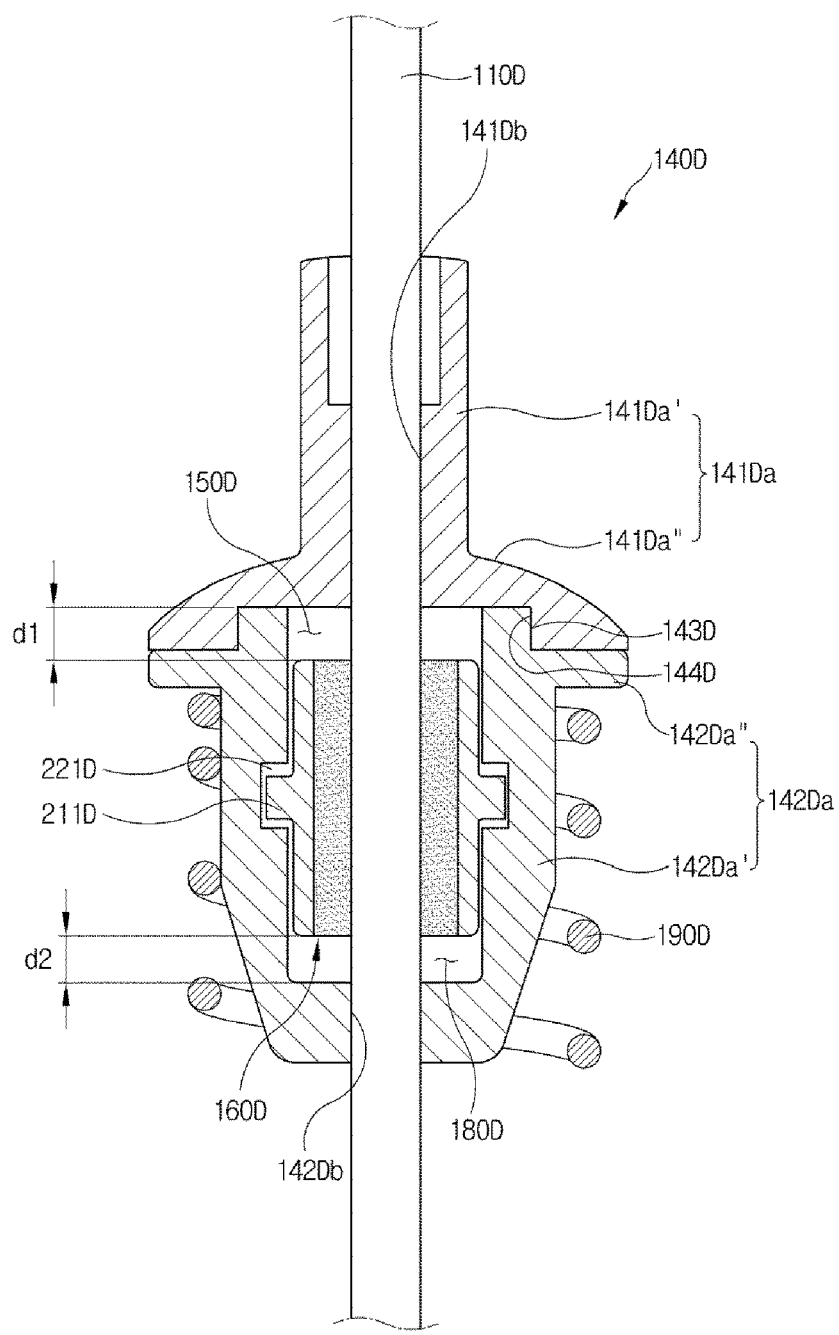
FIG. 16 is a cross-sectional view of a damping unit in accordance with even another embodiment of the present disclosure.
Figure 17:
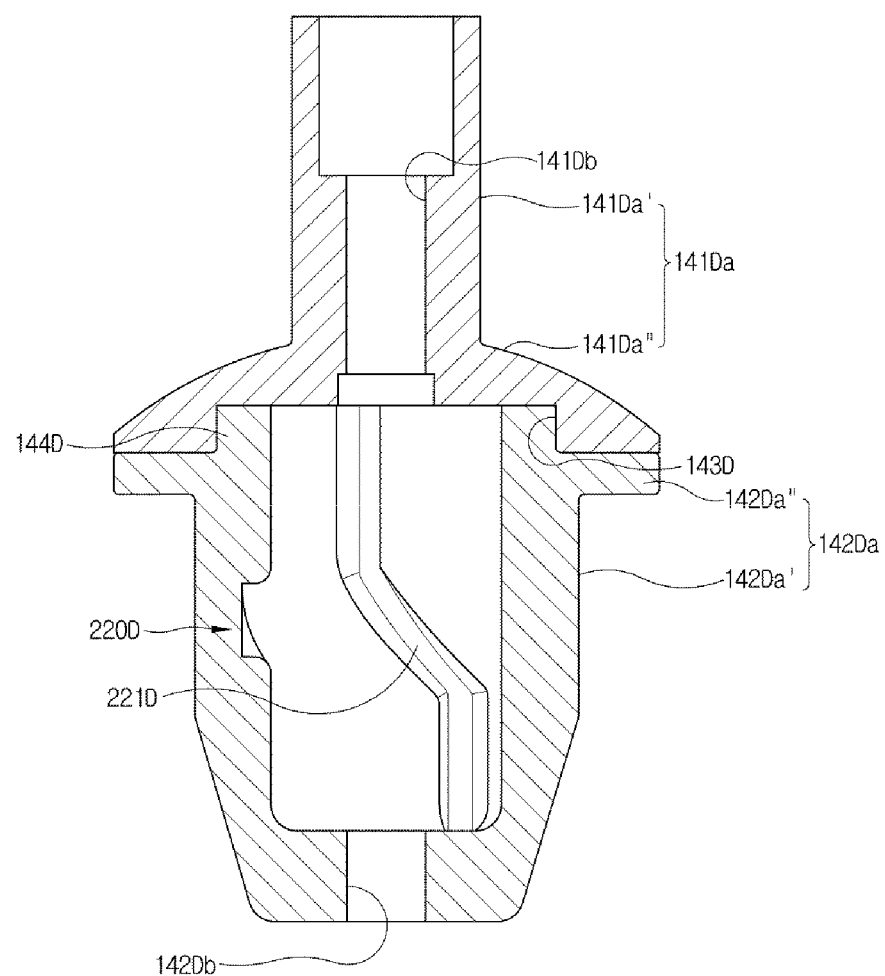
FIG. 17 is a view of a guide groove of the damping unit in accordance with even another embodiment of the present disclosure.

FIG. 15 is an exploded perspective view of a damping device in accordance with even another embodiment of the present disclosure. FIG. 16 is a cross-sectional view of a damping unit in accordance with even another embodiment of the present disclosure. FIG. 17 is a view of a guide groove of the damping unit in accordance with even another embodiment of the present disclosure. Reference numerals not shown in the drawings refer to FIGS. 1 to 8.

As shown in FIGS. 15 to 17, a damping device 100D includes a damping unit 140D installed at a suspension member 110D.

The damping unit 140D includes a first damping portion 141D and a second damping portion 142D. The first damping portion 141D and the second damping portion 142D may include a first through hole 141Db and a second through hole 142Db, respectively, to allow the suspension member 110D to pass through centers thereof.

The first damping portion 141D includes a first damping portion body 141Da which forms an exterior. The first damping portion body 141Da includes a first portion 141Da' at which the first through hole 141Db is formed to surround an outside of the suspension member 110D and a second portion 141Da" formed extending below the first portion 141Da'.

A first accommodating portion 150D may be formed in a central portion of the second portion 141Da" of the first damping portion body 141Da. The second portion 141Da" of the first damping portion body 141Da may be connected to the first through hole 141Db. Here, the first accommodating portion 150D may be formed greater than a width of the first through hole 141Db.

The second damping portion 142D is provided to be coupled below with the first damping portion 141D. The second damping portion 142D includes a second damping portion body 142Da which forms the exterior. The second damping portion body 142Da may include, in a central portion thereof, a first portion 142Da' which forms a second accommodating portion 180D and a second portion 142Da" provided to form a top end edge of the first portion 142Da' and to be coupled with the second portion 141Da" of the first damping portion 141D.

Here, a coupling groove 143D may be formed at the second portion 141Da" of the first damping portion body 141Da and a coupling protrusion 144D corresponding to the coupling groove 143D may be formed at the second portion 142Da" of the second damping portion body 142Da. In the embodiment, a coupling groove is formed at a first damping portion body and a coupling protrusion is formed at a second damping portion body to couple a first damping portion with a second damping portion as an example. However, the concept of the present disclosure is not limited thereto. For example, various structures and components capable of coupling a first damping portion with a second damping portion may be included.

Meanwhile, the first accommodating portion 150D of the first damping portion 141D and the second accommodating portion 180D of the second damping portion 142D may be formed corresponding to each other.

A friction unit 160D may be provided in the first accommodating portion 150D and the second accommodating portion 180D formed by coupling between the first damping portion 141D and the second damping portion 142D.

The friction unit 160D may be installed at the outside of the suspension member 110D and may be provided in the damping unit 140D. The friction unit 160D may be provided in the first accommodating portion 150D and the second accommodating portion 180D and may be movable integrally with the damping unit 140D.

Since the damping unit 140D integrally moves together with the tub 11, a frictional force occurs between the friction unit 160D and the suspension member 110D and thus a damping force of the damping device 100D may be increased.

Meanwhile, to be selectively movable along vibration displacement of the washing tub 12, the friction unit 160D may be disposed while spaced at a certain interval d1 from the first accommodating portion 150D and at a certain interval d2 from the second accommodating portion 180D. The intervals d1 and d2 of the friction unit 160D are provided to allow movement of the friction unit 160D to be stopped at a high speed spin zone in which the vibration displacement of the washing tub 12 is relatively small during the spin-drying operation of the washing machine 1.

Here, the intervals d1 and d2 of the friction unit 160D may be formed corresponding to vibration displacement of the washing machine 1. The intervals d1 and d2 of the friction unit 160D may be formed corresponding to separation as much as small vibration displacement which occurs in the high speed spin zone of the washing tub 12.

In detail, the frictional force between the friction unit 160D and the suspension member 110D reduces vibration displacement in a transient vibration section of a low speed spin zone in which the vibration displacement is great and driving is performed for a short time during the spin-drying operation. However, vibration transfer to the outside may be increased and then a vibration and noise of the exterior of the washing machine 1 may be generated in a normal vibration section of the high speed spin zone in which the vibration displacement is small and driving is performed for a long time.

Accordingly, when the friction unit 160D is spaced apart at the intervals d1 and d2 from the damping unit 140D in a longitudinal direction, the friction unit 160D does not move and is fixed at the time of a small vibration which occurs in the high speed spin zone of the washing tub 12 not to generate the damping force.

The friction unit 160D may include a first friction member 161D and a second friction member 162D.

The first friction member 161D may include felt. The first friction member 161D is formed to allow a felt panel to surround the outside of the suspension member 110D. The second friction member 162D is provided at an outside of the first friction member 161D to support the first friction member 161D.

The second friction member 162D may include a cylinder or a tube. The second friction member 162D may include a plastic or rubber material.

The second friction member 162D and the first friction member 161D may be provided while press-fitting on the outside of the suspension member 110D. The first friction member 161D and the second friction member 162D may generate a frictional force with the suspension member 110D due to a vibration and shock transferred from the tub 11.

The damping unit 140D may further include a guide portion 200D provided to be selectively rotatable and vertically movable according to a level of a vibration of the washing tub 12.

The guide portion 200D may include a first guide portion 210D provided at the friction unit 160D and a second guide portion 220D provided to guide movement of the first guide portion 210D.

The first guide portion 210D may be provided at the second friction member 162D of the friction unit 160D. The first guide portion 210D may include at least one guide protrusion 211D which protrudes from a center of an outer circumferential surface of the second friction member 162D.

The second guide portion 220D may be provided on an inner surface of the second damping portion 142D. The second guide portion 220D may include a guide groove 221D formed to allow the guide protrusion 211D of the first guide portion 210D to be coupled. The guide groove 221D may be tilted in a circumferential direction to allow the guide protrusion 211D to be coupled and to be rotatable and vertically movable.

Accordingly, the guide protrusion 211D which forms the first guide portion 210D of the friction unit 160D is guided by the guide groove 221D which forms the second guide portion 220D of the damping unit 140D to be rotatable around and vertically movable along the outside of the suspension member 110D.

Here, the guide groove 221D may include at least one spiral shape. The guide groove 221D and guide protrusion 211D may have the same size and number. In the embodiment, three guide protrusions 211D are formed on the outer circumferential surface of the second friction member 162D at intervals of 120 degrees as an example. However, the concept of the present disclosure is not limited thereto. For example, three or more or less guide protrusions may be formed. Here, the same number of guide grooves may be formed corresponding to the guide protrusions.

As is apparent from the above description, movement of a friction member is stopped in a high speed spin zone in which vibration displacement of a washing tub is small during a spin-drying operation, thereby reducing a vibration and noise of an exterior by minimizing vibration transfer to the outside.

Also, a damping force of a damper is changed according to vibration displacement of a washing machine, thereby reducing a vibration and noise to improve qualities of a product.

Also, depending on a level of vibration, a friction unit of a washing machine is allowed to rotate or vertically move in such a way that frictional movement is selectively performed and thus vibration transfer to the outside is reduced, thereby reducing a vibration and noise.

Although a few embodiments of the present disclosure have been shown and described, it would be appreciated by those skilled in the art that changes may be made in these embodiments without departing from the principles and spirit of the present disclosure, the scope of which is defined in the claims and their equivalents.

What is claimed is:
1. A washing machine comprising:
    a damping device provided to dampen a vibration transferred from a washing tub, wherein the damping device comprises:
        a suspension member,
        a damping unit supported by a bracket that is affixed to the washing tub and provided to move along the suspension member, and
        a friction unit provided in an accommodation portion within the damping unit, the friction unit is operably able to move along the suspension member and form a frictional force with the suspension member during certain vibrations associated with a spinning speed of the washing tub,
    wherein when the spinning speed of the washing tub is a first speed, the friction unit forms the frictional force with the suspension member as the friction unit moves within the accommodation portion along the suspension member, and when the spinning speed of the washing tub is a second speed the friction unit is fixed within the accommodation portion,
    wherein, the first speed is slower than the second speed, and
    wherein the friction unit is disposed while being spaced apart from an inner surface of the damping unit.

2. The washing machine of claim 1, wherein the friction unit comprises:
   a first friction member in contact with the suspension member; and
   a second friction member provided at an outside of the first friction member to support the first friction member.

3. The washing machine of claim 2, wherein the damping unit comprises:
   a first damping portion installed at the suspension member and comprising a first accommodating portion that accommodates at least one part of the friction unit; and
   a second damping portion that is provided below the first damping portion to be coupled with the first damping portion and comprises a second accommodating portion that accommodates another part of the friction unit.

4. The washing machine of claim 3, wherein the friction unit is installed while being spaced apart a predefined distance from a top end of the first accommodating portion.

5. The washing machine of claim 3, wherein the friction unit is installed while being spaced apart a predefined distance from a bottom end of the second accommodating portion.

6. The washing machine of claim 3, wherein the second friction member comprises a cylindrical shape.

7. The washing machine of claim 6, wherein the damping unit comprises a guide portion provided to be selectively rotatable and movable depending on a level of the vibration of the washing tub.

8. The washing machine of claim 7, wherein the guide portion comprises:
   a first guide portion provided at the friction unit; and
   a second guide portion provided at least one of the first damping portion and the second damping portion.

9. The washing machine of claim 8, wherein the first guide portion comprises at least one guide protrusion which protrudes from an outside of the second friction member.

10. The washing machine of claim 8, wherein the second guide portion comprises at least one guide groove slantingly formed at least one of the first damping portion and the second damping portion.

11. The washing machine of claim 10, wherein the at least one guide groove comprises a spiral shape.

12. The washing machine of claim 3, wherein a bottom end of the first damping portion and a top end of the second damping portion are formed corresponding to each other, and
   wherein the damping unit further comprises a connection portion provided to connect the first damping portion with the second damping portion.

13. The washing machine of claim 2, wherein the first friction member is formed of a felt material.

14. The washing machine of claim 2, wherein the second friction member includes a plastic material or a rubber material.

15. A washing machine comprising:
   a cabinet;
   a washing tub provided in the cabinet; and
   a damping device provided to dampen a vibration of the washing tub, wherein the damping device comprises:
      a suspension member with one end coupled with the cabinet,
      a damping unit supported by a bracket that is affixed to the washing tub and is provided to be movable along the suspension member and forms an accommodating portion therein, and
      a friction unit disposed in the accommodating portion and provided to be movable from the damping unit along the suspension member and form a frictional force with the suspension member during certain vibrations associated with a spinning speed of the washing tub,
   wherein when the spinning speed of the washing tub is a first speed, the friction unit forms the frictional force with the suspension member as the friction unit moves within the accommodation portion along the suspension member, and when the spinning speed of the washing tub is a second speed the friction unit is fixed within the accommodation portion, and
   wherein the first speed is slower than the second speed.

16. The washing machine of claim 15, wherein the friction unit is disposed while being spaced apart from an inner surface of the accommodating portion.

17. The washing machine of claim 16, wherein the friction unit comprises:
   a first friction member formed of a felt material and in contact with the suspension member; and
   a second friction member provided to support the first friction member at an outside of the first friction member.

18. The washing machine of claim 17, wherein the second friction member includes a plastic material or a rubber material.

19. The washing machine of claim 16, wherein the damping unit comprises:
   a first damping portion comprising a first accommodating portion that accommodates at least one part of the friction unit; and
   a second damping portion that is provided below the first damping portion to be coupled with the first damping portion and comprises a second accommodating portion that accommodates another part of the friction unit.

20. The washing machine of claim 19, wherein the friction unit is installed while being spaced apart from the first accommodating portion.

* * * * *